3,143,568
Patented Aug. 4, 1964

3,143,568
DIARYLAMINO-ACETYL-ARYL DERIVATIVES
Guido Cavallini and Elena Massarani, Milan, Italy, assignors to Francesco Vismara S.p.A., Casatenovo (Còmo), Italy, a firm
No Drawing. Filed Jan. 16, 1962, Ser. No. 166,715
Claims priority, application Italy Jan. 25, 1961
7 Claims. (Cl. 260—518)

This invention relates to novel diarylamino-acetyl-aryl derivatives of the following formula:

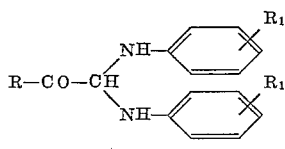

Formula I in which:
$R_1$ represents hydrogen, methyl, halogen of atomic weight less than 80, preferably chlorine or bromine, nitro, methoxy, carboxy or carbethoxy, $R_1$ being preferably in the para position with respect to the amino group; and
R represents one of the following groups:

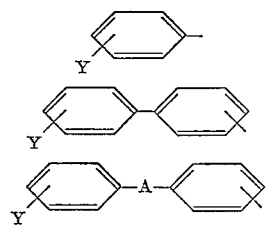

or

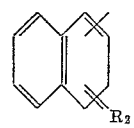

in which Y represents hydrogen, halogen of atomic weight less than 80, preferably chlorine or bromine, nitro, hydroxy, methoxy or

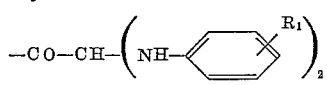

where $R_1$ is as defined above;
A represents oxygen, sulfur, sulfinyl, sulfonyl, methylene, ethylene or vinylene; and $R_2$ represents hydrogen or halogen of atomic weight less than 80, preferably chlorine or bromine.

The novel compounds of this invention possess antiviral activity against various viruses and are particularly active against influenza virus, hepatic virus, Herpes simplex, zooster or cornealis, Coxsackie virus, adenovirus and Carre virus.

Advantageous compounds of this invention are represented by the following formulas:

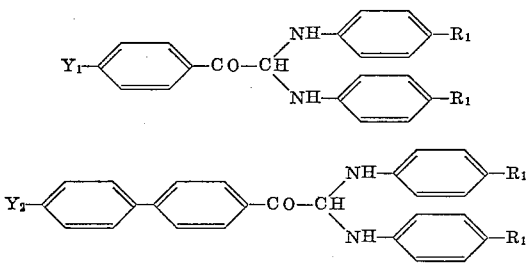

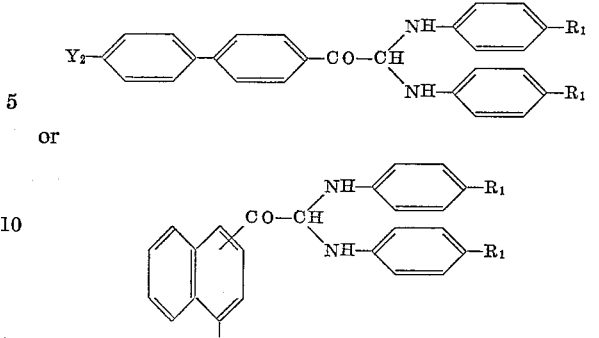

in which $R_1$ and $R_2$ are as defined above and
$Y_1$ represents hydrogen, chlorine, nitro, methoxy, hydroxy or

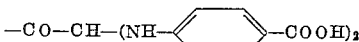

$Y_2$ represents hydrogen or

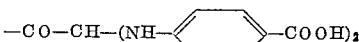

and
A represents oxygen, sulfur, sulfonyl, ethylene, methylene or vinylene.

The diarylamino-acetyl-aryl derivatives of this invention are prepared by reacting in the presence of a suitable solvent, a glyoxal of the formula:

$$R_3—CO—CHO$$

Formula II in which $R_3$ represents one of the following groups:

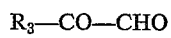

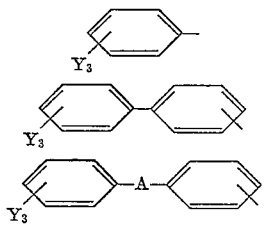

or

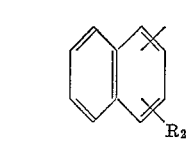

in which A and $R_2$ are as defined above and $Y_3$ represents hydrogen, halogen of atomic weight less than 80, preferably chlorine or bromine, nitro, hydroxy, methoxy or another —COCHO group, with an aromatic amine of the formula:

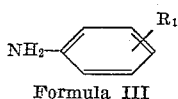

Formula III in which $R_1$ is as defined above. The glyoxal may also be reacted as an addition derivative for example as the hydrate or hemiacetal.

The glyoxal starting materials are either known or can be prepared readily for example by oxidation of corresponding methyl ketones with selenium dioxide or by treating gem-dihalogen derivatives of the same methyl ketone with an alkaline alcoholate and successive hydrolysis of the acetal thus obtained. The anhydrous glyoxals readily add water or alcohol to give the corresponding hydrates and alcoholates. Many of the glyoxal starting materials are disclosed in copending applications Serial Nos. 829,532, now U.S. 3,036,131; 41,765, and 45,281 now Patent No. 3,097,138.

Among the amines of Formula III useful to prepare the compounds of this invention, particularly suited are aniline, p-chloroaniline, p-nitroaniline, p-anisidine and p-aminobenzoic acid or ester.

As suitable solvents in the reaction to prepare the compounds of this invention there may be used lower aliphatic alcohols and also hydrocarbons, for example benzene and its homologues, hexane, cyclohexane or also solvents of the ether type such as tetrahydrofuran, dioxane and diethyl ether. Particularly advantageous solvents are ethanol, isopropanol, tertiary butanol and benzene.

The reaction is carried out using approximately two moles of the amine for every mole of the monoglyoxal or four moles of the amine for every mole of the bisglyoxal and operating at a temperature between ambient temperature (about 25° C.) and 80° C. preferably between 50–70° C. The reaction time can vary from about 30 minutes to about six hours depending upon the nature of the reagents and the temperature. In general, however, the reaction is practically complete after refluxing at 60° C. for about 4 hours. The diarylamino-acetyl-aryl derivative separates generally by cooling the reaction mixture and can thus be isolated by simple filtration. The product thus obtained is practically pure and sometimes crystallizes with a molecule of the reaction solvent. The yield of the final product is optimal and can approach 90% of theory.

The following examples illustrate the compounds of this invention and are not to be considered as limiting.

*Example 1*

A mixture of 1.34 g. of phenylglyoxal, 1.86 g. of aniline and 60 cc. of anhydrous benzene is heated at 60° C. for 4 hours. At the end of the reaction the mixture is cooled slowly to yield ω,ω-diphenylamino-acetophenone, which after filtering, washing with benzene and drying melts at 90–94° C.

Operating in an analogous manner, that is treating 1.4 g. of phenylglyoxal with 0.02 mole respectively of p-nitroaniline and p-chloroaniline, there is obtained the corresponding derivatives ω,ω-[di-(4-nitrophenylamino)]-acetophenone, M.P. 156° C. and ω,ω-[di-(4-chlorophenylamino)]-acetophenone, M.P. 120–122° C.

*Example 2*

Phenylglyoxal (1.34 g.) and 2.74 g. of p-aminobenzoic acid are heated at 60° C. for 2 hours in 30 cc. of tertiary butyl alcohol. Cooling separates the crystalline product ω,ω - [di - (4 - carboxyphenylamino)] - acetophenone, M.P. 174–176° C.

Similarly, treating 0.01 mole of phenylglyoxal with 0.02 mole of ethyl p-aminobenzoate there is obtained ω,ω-[di-(4-carbethoxyphenylamino)]-acetophenone, M.P. 144–145° C.

*Example 3*

A mixture of 1.34 g. of phenylglyoxal, 2.14 g. of p-toludine and 50 cc. of ethanol is heated at 50° C. for 4 hours and then cooled slowly. The precipitate is ω,ω-[di-(4-tolylamino)]-acetophenone, M.P. 110–111° C.

Similarly, treating 0.01 mole of phenylglyoxal with 0.02 mole of p-anisidine in ethanol yields ω,ω-[di-(4-methoxyphenylamino)]-acetophenone, M.P. 118° C.

*Example 4*

4-chlorophenylglyoxal (1.7 g.) and 2.74 g. of p-aminobenzoic acid are heated at 60° C. for 4 hours in 50 cc. of benzene. Following the procedure of Example 1, there is obtained ω,ω-[di-(4'-carboxyphenylamino)]-4-chloroacetophenone, M.P. 181° C.

Similarly, there is prepared ω,ω-[di-(4'-carbethoxyphenylamino)]-4-chloroacetophenone, M.P. 147° C.

*Example 5*

4-nitrophenylglyoxal (1.8 g., obtained from 4-nitroacetophenone) and 2.76 g. of p-nitroaniline are heated for 6 hours at 50° C. in 60 cc. of benzene. Following the procedure of Example 1 yields ω,ω-[di-(4'-nitrophenylamino)]-4-nitroacetophenone, M.P. 147–150° C.

*Example 6*

Following the procedure of Example 2, and treating in tertiary butyl alcohol 1.8 g. of 4-nitrophenylglyoxal with 0.02 mole respectively of p-aminobenzoic acid and its ethyl ester there is obtained the following derivatives, ω,ω - [di - (4' - carboxyphenylamino)] - 4 - nitroacetophenone, M.P. 159–161° C. and ω,ω-[di-(4'-carbethoxyphenylamino)]-4-nitroacetophenone, M.P. 103–105° C.

*Example 7*

4-methoxyphenylglyoxal (1.65 g.) is heated at 60° C. in 60 cc. of ethanol with 2.5 g. of p-anisdine for 30 minutes. The mixture is then allowed to cool and the separated precipitate is filtered, washed with benzene and dried to yield ω,ω-[di-(4'-methoxyphenylamino)]-4-methoxyacetophenone, M.P. 120–122° C.

Operating in an analogous manner, and substituting for the p-anisidine 0.02 mole of aniline yields ω,ω-diphenylamino-4-methoxyacetophenone, M.P. 96–97° C.

*Example 8*

Following the procedure of Example 2 and treating 4-methoxyphenylglyoxal with p-nitroaniline in tertiary butanol yields ω,ω-[di-(4'-nitrophenylamino)]-4-methoxyacetophenone, M.P. 161–163° C.

Similarly 4-hydroxyphenylglyoxal and aniline yield ω,ω-diphenylamino-4-hydroxyacetophenone.

*Example 9*

A mixture of 2.1 g. of diphenylyl-4-glyoxal, 2.76 g. of p-nitroaniline and 20 cc. of tertiary butyl alcohol is heated at 60° C. for 4 hours. Cooling yields the product, 4-[di-(4' - nitrophenylamino)] - acetyl - diphenyl, M.P. 166–168° C.

*Example 10*

A mixture of 2.1 g. of diphenylyl-4-glyoxal, 2.74 g. of p-aminobenzoic acid and 20 cc. of tertiary butyl alcohol is treated as in the preceding example. Cooling separates the product which after filtration, washing with ether and drying melts at 179–181° C. Analysis established that the product obtained is 4-[di-(4'-carboxyphenylamino)]-acetyl-diphenyl which crystallizes with one molecule of tertiary butyl alcohol.

Carrying out the same reaction in benzene instead of tertiary butyl alcohol yields 4-[di-(4'-carboxyphenylamino)]-acetyl-diphenyl, M.P. 176° C.

Using tetrahydrofuran as a solvent, the diamino derivative crystallizes with one mole of solvent and the product thus obtained melts at 165° C.

*Example 11*

A mixture of 2.1 g. of diphenylyl-4-glyoxal, 3.3 g. of ethyl p-aminobenzoate and 60 cc. of benzene is heated at 60° C. for 4 hours. The mixture is then cooled slowly to precipitate 4-[di-(4'-carbethoxyphenylamino)]-acetyl-diphenyl, M.P. 173–174° C.

The same reaction can also be carried out in tertiary butyl alcohol, tetrahydrofuran or dioxane.

*Example 12*

A mixture of 2.43 g. of diphenylether-4-glyoxal hydrate, 2.66 g. of p-anisidine and 60 cc. of ethanol is heated at 50° C. for 5 hours. At the end of the reaction the mixture is slowly cooled and the formed precipitate is filtered to give 4-[di-(4'-methoxyphenylamino)] - acetyl - diphenyl-ether, M.P. 90–94° C.

Example 13

A mixture of 2.59 g. of diphenylsulfide-4-glyoxal hydrate, 2.66 g. of p-anisidine and 60 cc. of benzene is heated at 50° C. for hours. Cooling and filtering yields 4-[di-(4'-methoxyphenylamino)]-acetyl-diphenylsulfide.

Example 14

A mixture of 2.55 g. of diphenylethane-4-glyoxal hydrate, 2.65 g. of p-anisidine and 60 cc. of benzene is heated at 60° C. for 3 hours. The cooled reaction mixture is filtered to yield 4-[di-(4'-methoxyphenylamino)]-acetyl-diphenylethane.

Similarly, there is prepared 4-[di-(4'-methoxyphenylamino)]-acetyl-stilbene and 4-[di-(4'-methoxyphenylamino)]-acetyl-diphenylmethane.

Example 15

A mixture of 2.9 g. of diphenylsulfone-4-glyoxal hydrate, 2.74 g. of p-aminobenzoic acid and 50 cc. of benzene is heated at 40° C. for 3 hours and then cooled to precipitate 4-[di-(4'-carboxyphenylamino)]-acetyl-diphenylsulfone.

Similarly, there is prepared 4-[di-(4'-carboxyphenylamino)]-acetyl-diphenylsulfoxide.

Example 16

A mixture of 2.1 g. of diphenylyl-2-glyoxal, 2.76 g. of p-nitroaniline and 20 cc. of benzene is heated at 60° C. for 4 hours. Cooling separates 2-[di-(4'-nitrophenylamino)]-acetyl-diphenyl.

Example 17

A mixture of 2.43 g. of diphenylether-3-glyoxal hydrate, 2.66 g. of p-anisidine and 50 cc. of benzene is heated for 6 hours at 45° C. Cooling the mixture and filtering the formed product yields 3-[di-(4'-methoxyphenylamino)]-acetyl-diphenylether.

Example 18

A mixture of 2.25 g. of p-methoxyphenylglyoxal isopropylate, 2.46 g. of p-anisidine and 30 cc. of isopropyl alcohol is heated at 60° C. for 3 hours. By successive cooling there is separated ω,ω-[di-(4'-methoxyphenylamino)]-4-methoxyacetophenone which crystallizes with one molecule of isopropyl alcohol, M.P. 170–172° C.

Similarly, treating 0.01 mole of p-chlorophenylglyoxal isopropylate with 0.02 mole of p-aminobenzoic acid yields ω,ω-[di-(4'-carboxyphenylamino)]-4-chloroacetophenone, which crystallizes with one mole of isopropyl alcohol, M.P. 162–164° C.

Example 19

Diphenylyl-4,4'-bisglyoxal dihydrate (3 g.) and 5.5 g. of p-aminobenzoic acid are heated at 70° C. for 4 hours in 50 cc. of benzene. After this period, the reaction mixture is cooled slowly to yield a precipitate, 4,4'-bis-[di-(4-carboxyphenylamino)-acetyl]-diphenyl.

Similarly 4,4'-bisglyoxalylbenzene dihydrate and p-aminobenzoic acid are reacted to yield 4,4'-bis-[di-(4-carboxyphenylamino)-acetyl]-benzene.

Example 20

A mixture of 3.18 g. of diphenylether-4,4'-bis-glyoxal dihydrate, 5 g. of p-anisidine and 60 cc. of benzene is heated at 60° C. for 4 hours. Following the procedure of Example 19 yields 4,4'-bis-[di-(4-methoxyphenylamino)-acetyl]-diphenylether.

Example 21

A mixture of 3.28 g. of diphenylethane-4,4'-bis-glyoxal dihydrate, 5.5 g. of p-aminobenzoic acid and 60 cc. of benzene is heated for 3 hours at 70° C. and then cooled slowly. The precipitate is 4,4'-bis-[di-(4-carboxyphenylamino)-acetyl]-diphenylethane.

Example 22

Diphenylyl-2,2'-bisglyoxal tetrahydrate (3.4 g.) and 4.3 g. of p-toluidine are heated at 50° C. for 4 hours in 60 cc. of benzene. From the reaction mixture separates after cooling a precipitate, 2,2'-bis-[di-(4-tolylamino)-acetyl]-diphenyl.

Example 23

Diphenylsulfone-4,4'-bisglyoxal dihydrate (3.66 g.) and 6.6 g. of ethyl p-aminobenzoate in 80 cc. of benzene are heated at 70° C. for 4 hours. Cooling the mixture separates 4,4'-bis-[di-(4-carbethoxyphenylamino)-acetyl]-diphenylsulfone.

Example 24

A mixture of 100 cc. of ethanol, 5 g. of naphthyl-1-glyoxal and 7.2 g. of p-aminobenzoic acid is refluxed for about 90 minutes and then cooled to 25° C. and filtered. The product is washed with acetone and then ether to give 1-[di-(4'-carboxyphenylamino)]-acetyl-naphthalene, M.P. 195° C. (dec.) The structure is confirmed by infrared analysis.

Example 25

Naphthyl-2-glyoxal hydrate (2 g.) and 2.74 g. of p-aminobenzoic acid are heated at 60° C. for 2 hours in 30 cc. of tertiary butyl alcohol. Cooling separates the crystalline product 2-[di-(4'-carboxyphenylamino)]-acetyl-naphthalene, M.P. 201–202° C.

Operating in a similar manner but using ethyl p-aminobenzoate in place of the free acid yields 2-[di-(4'-carbethoxyphenylamino)]-acetyl-naphthalene.

Example 26

A mixture of 7.75 g. of selenium dioxide, 2 cc. of water and 20 cc. of dioxane is heated at 70° C. while a solution of 10.2 g. of 1-acetyl-4-chloronaphthalene in 60 cc. of dioxane is dripped in. The mixture is refluxed for five hours, then filtered hot and partially evaporated. By vacuum distillation there is obtained 4-chloronaphthyl-1-glyoxal hydrate, B.P. 132–133° C./0.05 mm. Hg.

Following the procedure of Example 25, 2.36 g. of 4-chloronaphthyl-1-glyoxal hydrate and 2.74 g. of p-aminobenzoic acid are reacted to yield 1-[di-(4'-carboxyphenylamino)]-acetyl-4-chloronaphthalene.

Example 27

Following the procedures herein described the following compounds are similarly prepared.

ω,ω-[di-(4'chlorophenylamino)]-4-methoxyacetophenone,
ω,ω-[di-(4'-tolylamino)]-4-methoxyacetophenone,
ω,ω-[di-(4'-carboxyphenylamino)]-4-methoxyacetophenone,
ω,ω-[di-(4'-carbethoxyphenylamino)]-4-methoxyacetophenone,
4-[di-(4'-carboxyphenylamino)]-acetyl-diphenylethane,
4-[di-(4'-carboxyphenylamino)]-acetyl-diphenylether,
4-[di-(4'-carboxyphenylamino)]-acetyl-diphenyl-sulfide, and
4-[di-(4'-carbethoxyphenylamino)]-acetyl-diphenyl-sulfide.

What is claimed is:
1. A chemical compound of the formula:

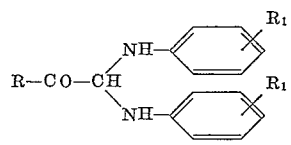

in which:
$R_1$ is a member selected from the group consisting of hydrogen, methyl, chlorine, bromine, nitro, methoxy, carboxy and carbethoxy; and R is a member selected from the group consisting of the following formulas:

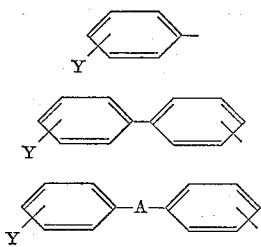

and

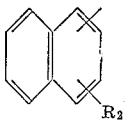

in which:
Y is a member selected from the group consisting of hydrogen, chlorine, bromine, nitro, hydroxy, methoxy and

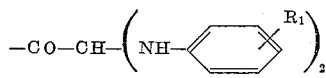

where $R_1$ is as defined above;

A is a member selected from the group consisting of oxygen, sulfur, sulfinyl, sulfonyl, methylene, ethylene and vinylene; and
$R_2$ is a member selected from the group consisting of hydrogen, chlorine and bromine.

2. A chemical compound of the formula:

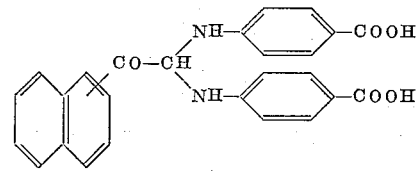

3. 1 - [di - (4'-carboxyphenylamino)]-acetyl-naphthalene.
4. 1 - [di - (4'-carboxyphenylamino)]-acetyl-4-chloronaphthalene.
5. ω,ω-[di-(4-carboxyphenylamino)]-acetophenone.
6. 4-[di-(4'-carboxyphenylamino)]-acetyl-diphenyl.
7. 4,4' - bis - [di - (4-carboxyphenylamino)-acetyl]-diphenyl.

References Cited in the file of this patent
UNITED STATES PATENTS
3,036,131    Cavallini et al. _____ May 22, 1962